United States Patent
Riggs et al.

[11] Patent Number: 5,439,727
[45] Date of Patent: Aug. 8, 1995

[54] SURFACE ANTI-SCUFF DEVICE AND SYSTEM

[76] Inventors: Brian G. Riggs, 3016 E. Locust St., Fort Collins, Colo. 80524; Fernardo Ramirez, 3500 Galway Dr., LaPorte, Colo. 80535

[21] Appl. No.: 199,782

[22] Filed: Feb. 22, 1994

[51] Int. Cl.6 .......... B60B 7/02; B60C 27/18; B60C 19/00; B60R 27/00
[52] U.S. Cl. .................. 428/128; 428/66.6; 428/66.7; D12/202; 150/154; 150/166; 152/187; 152/213 A; 152/DIG. 14
[58] Field of Search ............. 152/170, 173, 175, 189, 152/208, 211, 213 A, 221, DIG. 14; 238/14; 150/154, 166; 280/850, 855, 856; 224/42.2; D12/202; 206/304.1; 301/37.1; 428/127, 128, 129, 130, 65, 66

[56] References Cited

U.S. PATENT DOCUMENTS

| | | | |
|---|---|---|---|
| 1,303,224 | 5/1919 | Achtmeyer | 206/304.1 |
| 1,700,081 | 1/1929 | Schemmel | 206/304.1 |
| 1,755,133 | 4/1930 | Rowe | 206/304.1 |
| 1,967,522 | 7/1934 | Wengard | 206/304.1 |
| 2,070,819 | 2/1937 | Zerk | 206/304.1 |
| 3,326,259 | 6/1967 | McCollegan | 206/304.1 |

FOREIGN PATENT DOCUMENTS 10922 of 1897 United Kingdom .

*Primary Examiner*—Michael W. Ball
*Assistant Examiner*—Francis J. Lorin
*Attorney, Agent, or Firm*—Ancel W. Lewis, Jr.

[57] ABSTRACT

A surface anti-scuff device and system is disclosed wherein an anti-scuff member in the form of a strip of material having a high degree of abrasion resistance and a high degree of scuff resistance such as CORDURA ® PLUS is mounted on each tire of a vehicle whereby the tires can move over the surface without scuffing the surface.

9 Claims, 2 Drawing Sheets

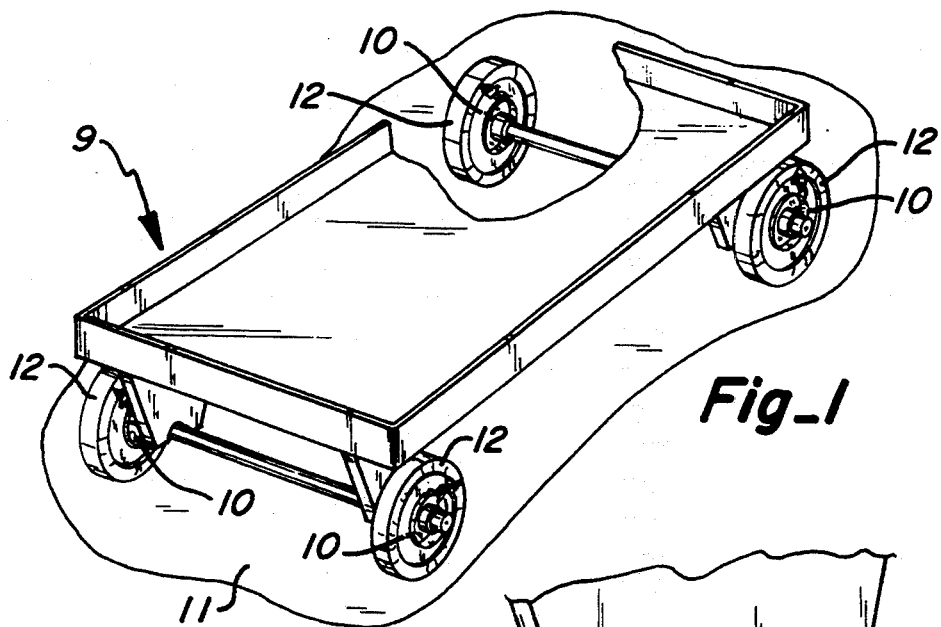
Fig_1
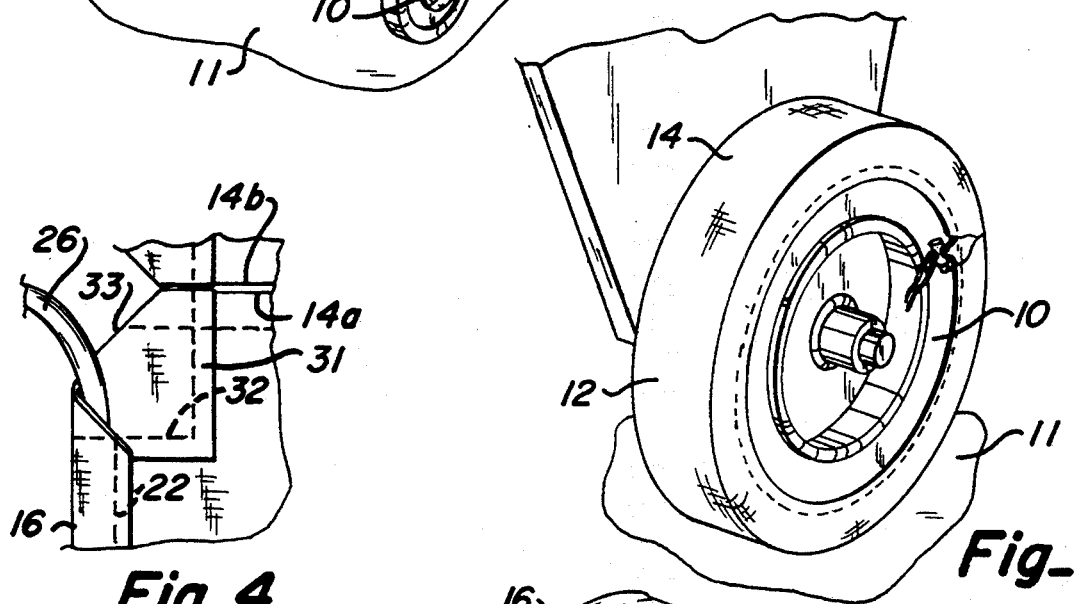
Fig_2
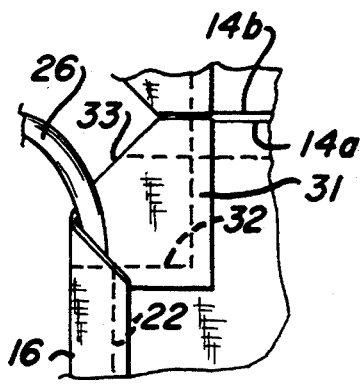
Fig_4
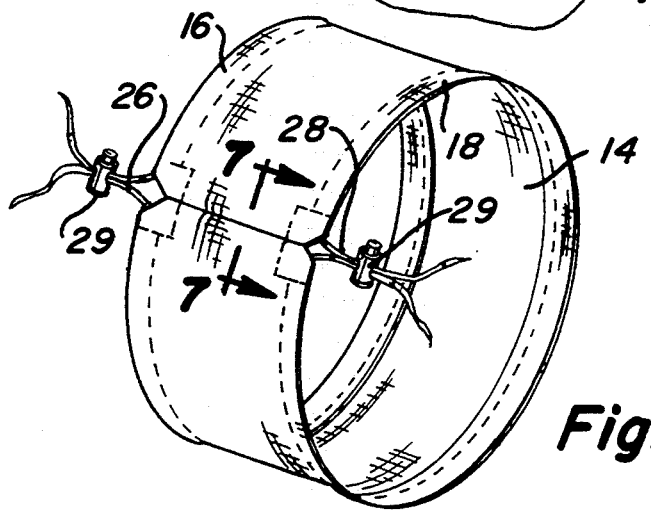
Fig_3

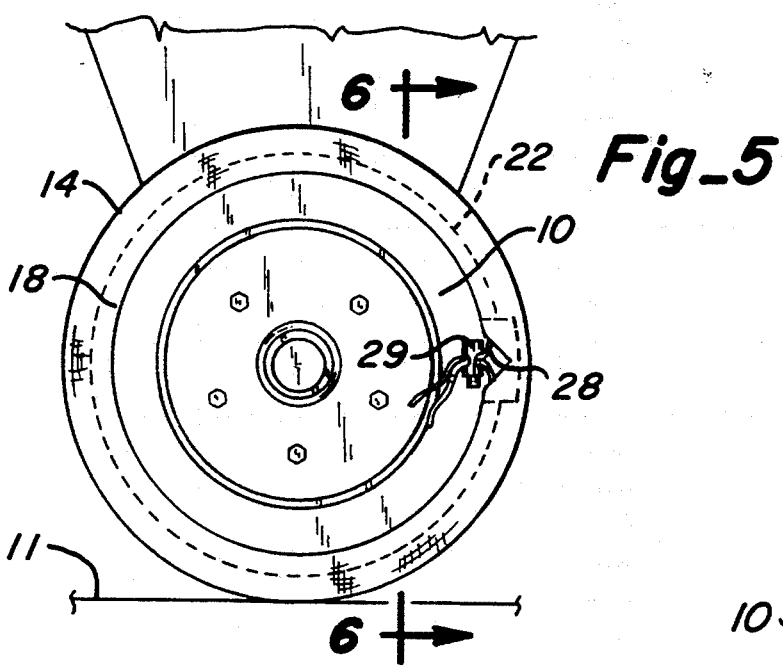
Fig_5
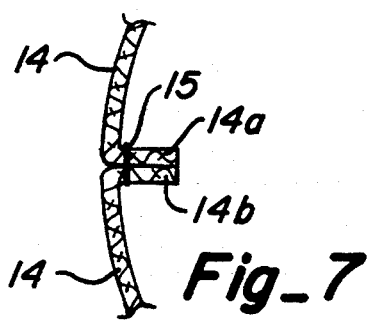
Fig_7
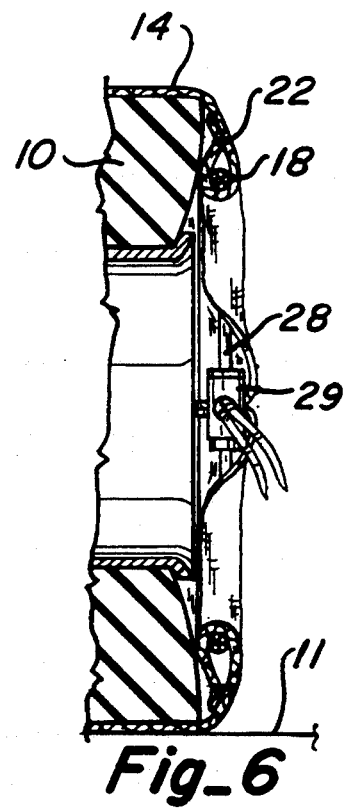
Fig_6
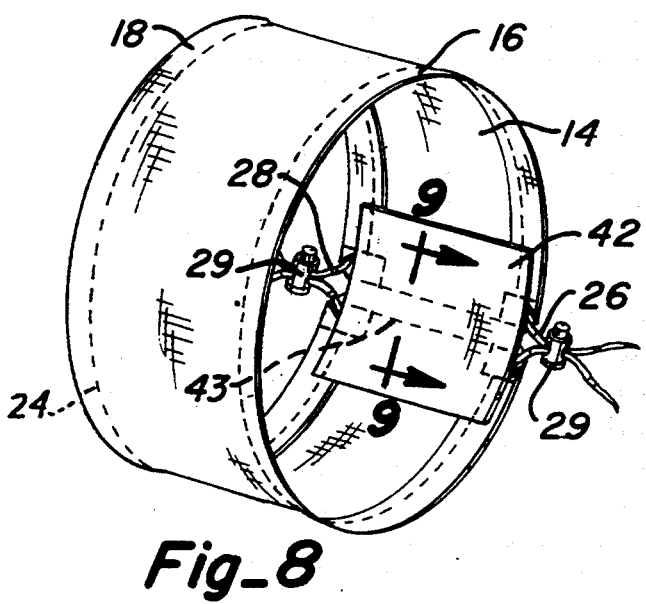
Fig_8
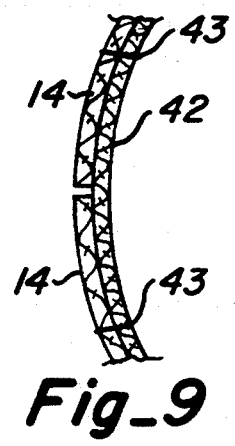
Fig_9

SURFACE ANTI-SCUFF DEVICE AND SYSTEM

TECHNICAL FIELD

This invention relates generally to protecting a surface from damage by vehicle tires and more particularly to a novel surface anti-scuff device and system for vehicle tires.

Background Art

There are many surfaces over which vehicles are moved which can be severely damaged by the mars and scuffs provided by vehicle tires. There is a need for an effective anti-scuff device and system that will prevent scuffing or marring of a Surface when a vehicle is moved or driven over a surface. For example, scuffing and marring of surfaces results in expensive and extensive clean up for contractors on many construction jobsites. Smooth concrete is one example of a surface that is easily damaged by such vehicle travel. Vehicle travel frequently results in black marks on a variety of types of flooring. A technique presently in use is to wrap duct tape over the tire tread. A disadvantage of this approach is difficulty in removing the tape and frequently the glue on the tape is transmitted to the surface.

Disclosure of the Invention

In accordance with the present invention, there is provided a surface anti-scuff device including an anti-scuff member that readily mounts onto and demounts from a tire and on the tire extends around the circumference and a portion of the sides thereof and is fastened tightly to the tire as by draw strings so that during movement over the surface the tire cannot scuff or mar or substantially prevents scuffing of the surface over which the tire is driven. In an anti-scuff system for vehicles each tire of the vehicle is provided with a similar surface anti-scuff device.

BRIEF DESCRIPTION OF THE DRAWINGS

Details of this invention are described in connection with the accompanying drawings which like parts bear similar reference numerals in which:

FIG. 1 is a perspective view of a four wheeled vehicle with each tire equipped with an anti-scuff device embodying features of the present invention.

FIG. 2 is an enlarged perspective view of one of the tires and anti-scuff device shown in FIG. 1.

FIG. 3 is a perspective view of an anti-scuff device in a flat condition prior to assembly to the tire.

FIG. 4 is an enlarged inside elevation view of a corner portion of the draw line assembly at the connected ends of the strip of material.

FIG. 5 is a side elevation view of the device shown in FIG. 2.

FIG. 6 is a sectional view taken along line 6—6 of FIG. 5.

FIG. 7 is a sectional view taken along line 7—7 of FIG. 5.

FIG. 8 is a perspective view of an alternative embodiment of an anti-scuff device.

FIG. 9 is a sectional view taken along line 9—9 of FIG. 8.

DETAILED DESCRIPTION

Referring now to the drawings there is shown in FIG. 1 a wheeled vehicle 9 having four wheels each with a tire 10. This vehicle 9 is illustrative of any type of motorized or non-motorized vehicle that may be moved over a supporting surface 11. Each tire 10 has an anti-scuff device 12 mounted thereon to provide a surface anti-scuff system for the vehicle 9. Each surface anti-scuff device 12 includes an anti-scuff or non-scuffing member 14 shown in the form of a single rectangular strip of material of a preselected width and length that is sized according to tire size that is wider than the tire tread so it will overlay the tire tread and a portion of each sidewall of the tire with the strip being fastened to the tire along both sides. The strip is secured at the ends by folding the opposite end portions 14a and 14b of the strip 14 against one another and securing them as with stitching 15 to form the strip 14 into a closed loop having substantially the same circumference as the circumference of the tire to which it is secured.

A first folded side edge portion 16 is provided along an inner side edge of the material 14 and a second folded side edge portion 18 is provided along the opposite outer side edge of the material. These edge portions 16 and 18 are formed as by stitching at lines 22 and 24, respectively. A first draw line 26 is provided in the first folded edge portion 16 and a second draw line 28 is provided in the second folded side edge portion so that the draw lines 26 and 28 can be used to draw the strip of material 14 tightly against the circumference and portion as of the sidewalls on both sides of the tread of the tire. The opposite end portions of the draw lines are shown held by a conventional line clamp 29 having a hole through which two of the draw lines extend and a spring biased button that releases when depressed. The draw lines could also be tied in a suitable, readily releasable knot.

At each end of each folded side edge portion and at the connected end portions 14a and 14b a corner portion 31 of the material is folded over and secured as by stitching 32 to provide a double-thickness beveled edge portion 33. This enables each draw string to be pulled on a straight line so there is uniform pull and no bunching up of the material.

A material found suitable for this anti-scuff member 14 is CORDURA ® PLUS manufactured by DuPont Company. This product is a pliable, tightly woven nylon, preferably a plain weave that will readily conform to the exterior surface of the tread and sidewalls of the tire and is provided with an inside coating or layer to make it water resistant. It is found that if this strip is held tightly to the tire, tread and along the sides that vehicles with rubber tires can be driven over a surface to prevent or substantially prevent scuffing the surface or without significantly scuffing the surface.

An alternative embodiment shown in FIGS. 8 and 9 has a stretchable strip of material 42 of a suitable elastic material fastened at and between folded end portions of the anti-scuff member 14 to enable the closed loop to stretch slightly over a limited width. This stretchable strip of material 42 is shown sewn to the ends as by stitching indicated at 43.

Although the present invention has been described with a certain degree of particularity, it is understood that the present disclosure has been made by way of example and that changes in details of structure may be made without departing from the spirit thereof.

What is claimed is:

1. A surface anti-scuff device for use on a vehicle tire during movement over a supporting surface comprising in combination:

an anti-scuff member in the form of a strip of material for extending around the circumference of and fastened tightly to a vehicle tire and against the tire tread and for being in contact with said supporting surface, said anti-scuff member being made of a pliable, durable, strip of non-scuff material, whereby when the tire and member are moved over a supporting surface said member will remain in place on the tire and the tire and member to substantially prevent scuffing said supporting surface, said strip of material being wider than the width of the tire tread and overlaying the tread and a portion of each side of sidewall, said strip of material being fastened at opposite end portions to form a closed loop having approximately the same circumference as the circumference of the tire, said strip of material having first and second folded edge portions on opposite side edges with first and second draw lines extending through said first and second folded edge portions, respectively, said strip of material having at each end and each corner a corner flap portion folded over and secured to provide a double thickness beveled edge portion with each folded edge portion terminating inwardly of the fastened ends to enable the end portion of the associated draw line to pull straight through the associated folded edge portion, said draw line drawing said strip of material tightly to the circumference of the tire on both sides of the tire tread, and opposite end portions of each of said first and second draw lines being connected together to hold said first and second draw lines taut.

2. A surface anti-scuff device as set forth in claim 1 wherein said material is made of a tightly woven nylon with a coating on a surface that engages the tire tread.

3. A surface anti-scuff device as set forth in claim 2 wherein said coating is of a waterproofing composition.

4. A surface anti-scuff device as set forth in claim 3 wherein said material is CORDURA ® PLUS having a plain weave.

5. A surface anti-scuff device as set forth in claim 1 wherein said material is made of a tightly woven nylon and has a high degree of abrasion resistance and a high degree of scuff resistance.

6. A surface anti-scuff device as set forth in claim 1 wherein said strip of material has an elastic strip of material fastened at and between abutting ends of said strip of material to enable the closed loop to expand the circumference of the closed loop to facilitate assembly and disassembly onto and off from a tire.

7. A device as set forth in claim 1 wherein the opposite end portions of the strip of material are folded against one another and secured with stitching.

8. A device as set forth in claim 1 wherein the opposite end portions of each of said draw lines extend through a quick release clamp to hold said lines taut and readily release said draw lines for removal of said member from said tire.

9. A surface anti-scuff system for use on a vehicle having a plurality of tires, the combination comprising:

a plurality of protective anti-scuff devices, each device mounted on a respective tire in contact with the supporting surface over which the tires are moved, each said protective anti-scuff device including a protective anti-scuff member, said member being in the form of a strip of material for extending around the circumference of and fastened tightly to a vehicle tire and against the tire tread and for being in contact with said supporting surface, said anti-scuff member being made of a pliable, durable, strip of non-scuff material, whereby when the tire and member are moved over a supporting surface said member will remain in place on the tire to substantially prevent scuffing said supporting surface, said strip of material being wider than the width of the tire tread and overlaying the tread and portion of each sidewall, said strip of material being fastened at opposite end portions to form a closed loop having approximately the same circumference as the circumference of the tire, said strip of material having first and second folded edge portions on opposite side edges with first and second draw line extending through said first and second folded edge portions, respectively, said strip of material having at each end and each corner a corner flap portion folded over and secured provide a double thickness beveled edge portion with each folded edge portion terminating inwardly of the fastened ends to enable the end portion of the associated draw line to pull straight through the associated folded edge portion, said draw lines drawing said strip of material tightly to the circumference of the tire on both sides of the respective tire tread, and opposite end portions of each of said first and second draw lines being connected together to hold said first and second draw lines taut.

* * * * *